Patented July 19, 1927.

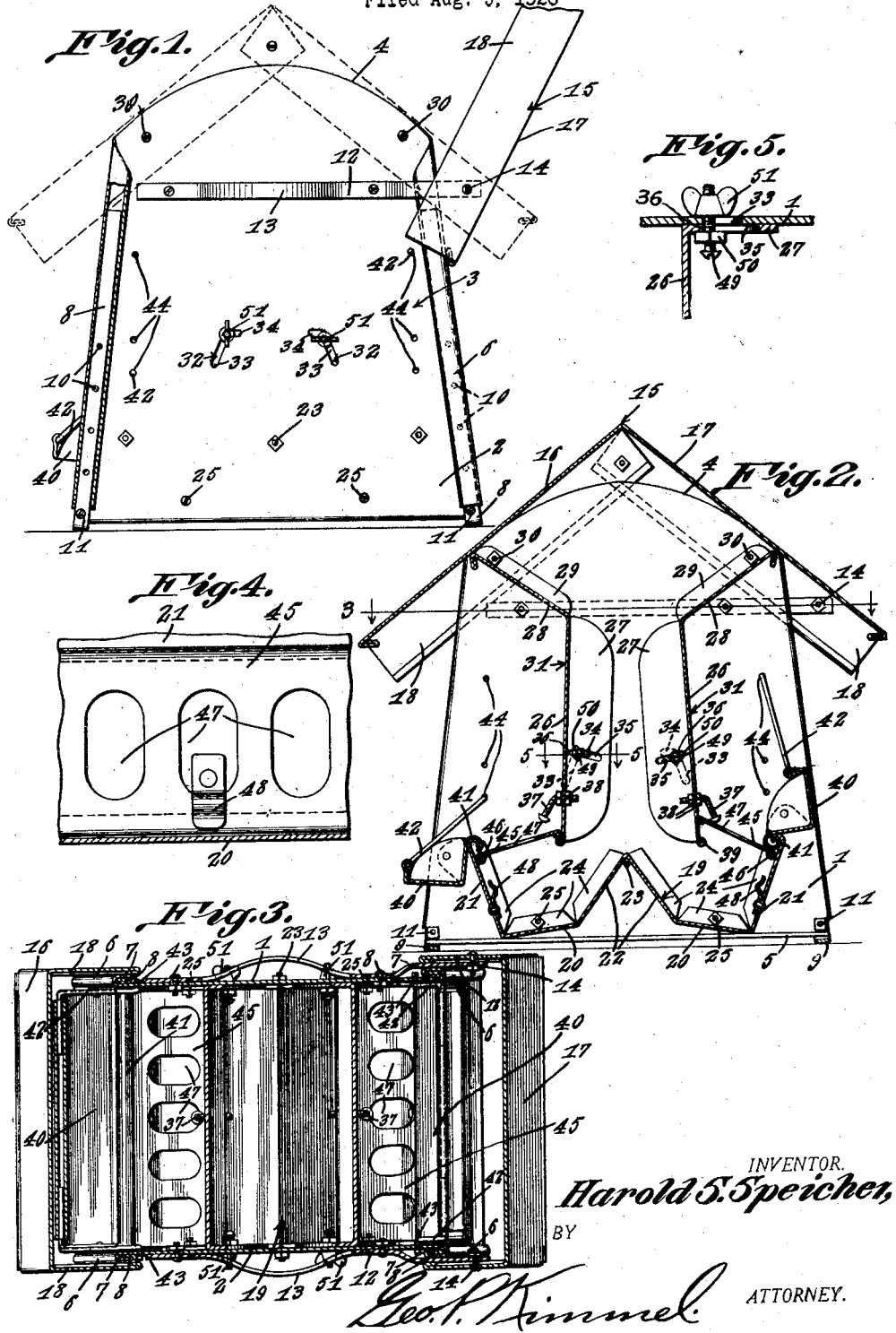

1,636,658

UNITED STATES PATENT OFFICE.

HAROLD S. SPEICHER, OF URBANA, INDIANA, ASSIGNOR TO THE CYCLONE MANUFACTURING COMPANY, OF URBANA, INDIANA.

ADJUSTABLE FEEDER.

Application filed August 5, 1926. Serial No. 127,315.

This invention relates to a poultry feeder, designed primarily for the feeding of chicks, but it is furthermore practical for the growing flock and matured fowl, from a feeding standpoint, and has for its object to provide, a feeder of such class, in a manner as hereinafter referred to for feeding the tiniest chick, as well as the growing flock and matured fowls without wasting or clogging of the feed.

A further object of the invention is to provide, in a manner as hereinafter set forth, a poultry feeder having means for keeping a supply of clean feed within easy reach of the tiniest chick without the chicks wasting or getting into the feed.

A further object of the invention is to provide, in a manner as hereinafter set forth, a poultry feeder having means for adjusting the same to provide for the satisfactory feeding of the tiniest chick, growing fowls and matured fowls without wasting or clogging.

Further objects of the invention are to provide, in a manner as hereinafter set forth, a poultry feeder which is simple in its construction and arrangement, strong, durable, compact, adjustable, thoroughly efficient in its use, readily assembled, and comparatively inexpensive to set up.

With the foregoing and other objects in view, the invention consists of the novel construction, combination and arrangement of parts, as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation, partly in section, of a poultry feeder in accordance with this invention.

Figure 2 is a vertical sectional view thereof.

Figure 3 is a section on line 3—3 Figure 2.

Figure 4 is a fragmentary view in plan of the grate.

Figure 5 is a section on line 5—5 Figure 2.

Referring to the drawings in detail 1 and 2 indicate a pair of side plates and which form the side walls of the housing of the feeder. The housing is referred to generally by the reference character 3. Each of the side plates is of like construction and the description of one will apply to the other. Each side plate is of tapered contour and formed with an arcuate top edge 4. Each side plate at its lower end is provided with an inwardly extending right angularly disposed flange 5. The front and rear marginal portions of each side plate is bent upon the outer face of the latter as at 6 to provide a pocket 7. The pocket 7 receives the arms 8 of a pair of combined yoke-shaped coupling and supporting members 9 which depend below the side plates 1 and 2. One of the members 9 is arranged at the front of the housing 3 and the other member 9 at the rear thereof and each of said members couple the side plates 1 and 2 together. The base of the members 9 act as a support for the housing 3, see Figures 1 and 2. The base of each of the members 9 is arranged below the flanges 5. The arms 8 of each of the members 9 is provided with a series of openings 10 to provide for the vertical adjustment of the housing 3 relative to the base of each of the members 9 and in this connection removable hold fast devices 11 are provided for detachably connecting the members 9 to the side plates 1 and 2. The plates 1 and 2 have openings which selectively register with one of the openings formed in each of the arms 8. A hold fast device 11 is associated with each arm 8 and two hold fast devices 11 are associated with each side plate.

Each side plate in proximity to its upper end has secured to the outer face thereof a transversely extending handle member 12 bowed as at 13 to provide a grip. The handle members 12 project rearwardly from the housing 3 and have hinged to their rear projecting ends, as at 14 a cover or closure 15 for the top of the housing 3. The cover 15 consists of a pair of oppositely extending and downwardly inclined sections 16, 17 each provided with depending flanges 18 which overlap the upper ends of the sides of the housing 3 when the cover is shifted to closed position as illustrated in dotted lines in Figure 1 and full lines in Figure 2. The section 17 of the closure or cover 15 is the rear section and the said section 15 is pivotally connected or hinged to the rear ends of the handle members 12 as indicated at 14. In Figure 1 the cover or closure 15 is shown swung to open position as illustrated in full lines. In Figure 2 the cover is illustrated in closed position with respect to the upper end of the housing 3.

The housing 3 is open at its front and at its rear and arranged between the side plates 1 and 2 at the lower portions thereof is a pair of oppositely disposed food or feed containers referred to generally by the reference character 19 and as each of said containers is of the same construction, but one will be described as the description of one will apply to the other. The containers are of a length to extend from the side wall 1 to the side wall 2 and they are also secured to said walls. The pair of oppositely extending containers are preferably formed from a single strip or sheet of metallic material, by way of example galvanized iron or zinc of any suitable gage, but can be set up from two sheets if desired, and each container comprises a bottom portion 20, a front portion 21 and a rear portion 22. The rear portions of the containers merge into each other and at the point of mergence thereof there is positioned a supporting bar 23 which is connected to the side plates 1 and 2. The portions 20, 21 and 22 of each container are flanged as at 24. The portion 20 of each container is extended at an upward inclination with respect to a flange 5, see Figure 2. The portion 22 of each container extends upwardly and rearwardly at an inclination with respect to the portion 20 of the container. The portion 21 of each container extends upwardly and forwardly at an inclination with respect to the portion 20 of the container. The flanges 24 of each portion 20 are secured to the side plates 1 and 2 by removable hold fast devices 25. The supporting rod or bar 23, in connection with the hold fast devices 25 maintain the containers in position between the side walls of the housing 3.

Arranged within the housing 3 and positioned above and spaced from the oppositely disposed feed containers is a combined feed supply directing and feed flow regulating means and which includes a pair of oppositely disposed, spaced wall-forming members which are arranged between the side walls of the housing 3 and extend from one side wall to the other thereof. As the wall-forming members are of the same construction, but one will be described, as the description of one will apply to the other. As before stated the wall forming members are oppositely disposed with respect to each other and each of which consists of a vertically disposed plate 26 provided at each end with an inwardly extending flange 27. The top of the plate 26 merges into an upwardly extending and upwardly inclined extension 28 provided at each end with an upstanding flange 29 through which extends a hold fast device 30 for coupling the flange 29 to a side plate 1 or a side plate 2. The flanges 29 are of less width than the flanges 27. The oppositely disposed wall forming members are referred to generally by the reference character 31 and each of which is independently adjustable. The wall forming members 31 in connection with the side walls of the housing provide means for confining a body of feed within the housing 3 and further said wall forming members 31 can be adjusted relatively to each other or at different inclinations to control the flow of the feed to the containers which are positioned below the members 31. Each side plate is provided with a pair of oppositely disposed spaced slots and which are referred to generally by the reference character 32. Each slot consists of an inclined leg 33 and a horizontal leg 34 which extends from the upper end of the leg 33 and is inclined slightly upwardly. The leg 33 is disposed at an outward inclination and is of greater length than the length of the leg 34. Each flange 27 is formed with a transversely extending inclined slot 35 which associates with the slot 32. The slot 35 is adapted to have a portion of its length to register with a portion of the length of a slot 32 and common to said registering slots is a removable hold fast device 36 which can be set for the purpose of fixedly securing a wall forming member 31 in adjusted position with respect to the side plates or side walls of the housing 3. In Figure 2 of the drawings one of the wall forming members 31 is illustrated in normal position and the other wall forming member 31 in adjusted position. Each wall forming member 31, centrally of its lower end, and above its bottom, is provided with a stop member 37 of angular form and further peripherally threaded. Each stop member depends at a downward and outward inclination with respect to that wall forming member to which it is connected and securing nuts 38 are carried by each stop member 37 for the purpose of connecting it to a wall forming member 31. The stop members 37 are provided to limit the upward adjustment of the chick grates to be presently referred to. The lower end of each wall forming member 31 is constructed to provide a ledge 39 for a purpose to be presently referred to.

Associated with each feed container is a feed saving tray 40, and which is hinged as at 41 to the front portion 21 of that feed container with which the tray 40 is associated. The trays 40 are arranged outwardly with respect to a feed container and act as steps for the chicks. The tray 40 is adjustably supported and for such purpose each end of the tray 40 is provided with a pair of hinged arms 42 having the upper end thereof formed with a right angular extension 43. The extensions 43 of the arms 42 of the tray 40 selectively engage with openings 44 formed in the side plates 1 and 2 for the purpose of adjusting the tray 40 to the desired position and for maintaining it in the position to which it has been adjusted.

Associated with each feed container is a chick grate 45, which is hinged as at 46 to the front portion 21 of that feed container with which it is associated and further extends rearwardly from said portion 21, see Figure 2. The grate 45 is adapted to abut against a wall forming member 31, as shown in Figure 2 or to rest on the ledge 39. When the grate 45 is in position it will be disposed at an inclination and the chicks or fowls will feed through the openings 47 formed in the grate, as the latter is arranged over the feed which is supplied to a feed container. The upward movement of the grate 45, at the rear thereof, is arrested by a stop member 37, see Figure 2. The portion 21 of each container carries a latch member 48 for connecting its associated grate to the portion 21 when the grate 45 is not arranged in position to extend over the feed within the container. The grate 45 is shown in latched position in Figure 4.

With reference to Figure 5 it illustrates a hold fast device 36 for retaining the wall forming member 31 in position and said hold fast device consists of a bolt 49, a nut 50 which abuts against a flange 27 and a wing nut 51 mounted on the bolt 49 exteriorly of the side plate and which abuts against the outer face of the side plate and in connection with the nut 50 will clamp the flange 27 against the side plate of the housing.

When using the feeder for baby chicks, the trays 40 are lowered and will act as steps for the chicks. When the trays 40 are lowered the arms 42 are engaged in the lower opening of the openings 44 formed in the side plates 1 and 2. By loosening the wing nuts 51 the members 31 can be shifted upwardly to the desired position to control the flow of feed in conjunction with the grates 45 which are swung upwardly to be positioned over the feed in the containers. After the members 31 have been adjusted they are fixedly secured in such position. The members 31 are moved outwardly to keep the chicks out of the feed. This adjustment keeps the chicks out of the feed, yet places it within reach of the tiniest. To get the chicks accustomed to eating at the feeder, place a little feed on the steps for the first day or two. Inch boards can be placed on either side of the feeder to make an easy approach for the baby chicks.

For the growing chicks; move the members 31 inwardly as far as slots will allow but downward no more than necessary to prevent feed flowing too freely. When chicks stand on ground to eat from feeder the feed saving trays may be raised so that the arms 42 will snap in the second hole from the bottom of the holes or openings 44.

For the matured flock; the chick grates may be lowered by raising sides upwardly and inwardly which allows them to swing downwardly against the inner faces of the portions 31 of the feed containers or pans. The feed saving trays are raised so that the arms 42 will engage in the upper openings of the openings 44 in the side plates. Adjust the members 31 as far as slots allow and downward only enough to prevent feed flowing too freely.

For flocks of varying sizes, adjust one side to suit the size of the smaller fowls.

As to the adjustment of the housing, as a rule the members 9 are only necessary for the larger breeds, and in which instance they may be adjusted to make feeder the correct height.

In connection with feed flow adjustment, a quarter of an inch, up or down, of the feed flow adjuster, will make a considerable difference in the flow of feed and this should be taken into consideration when adjusting.

The construction of feeder as hereinbefore described provides a chick feeder which will keep plenty of clean sweet feed within easy reach of the tiniest chicks without them wasting or getting into it and furthermore the feeders are practical for the growing flock and matured fowls as well as the baby chicks feeding them without wasting or clogging. The feeder provides a handy quick adjustment to enable the feeding of a growing flock or matured fowls and preferably is of a size that one filling lasts two hundred to two hundred and seventy-five chicks approximately one week, therefore it is thought that the many advantages of an adjustable poultry feeder, in accordance with this invention can be readily understood, and although the preferred embodiment of the invention is as illustrated and described, yet it is to be understood that changes in the details of construction can be had which will fall within the scope of the invention as claimed.

What I claim is:—

1. A poultry feeder comprising a housing, a feed pan arranged therein at the lower portion thereof and enclosed thereby, means within said housing for regulating the flow of feed to said pan, and a grate hinged at its outer side against the inner face of the outer wall of the pan and adapted to be arranged over the feed therein and further adapted to have its inner side slidably abut against said means.

2. A poultry feeder comprising a housing, a feed pan arranged therein at the lower portion thereof, bodily adjustable means within said housing for regulating the flow of feed to said pan, an adjustable feed saving tray hinged to the outer wall of the pan, and means carried by the tray and detachably engaging in the side walls of the housing for supporting the tray in adjusted position.

3. A poultry feeder comprising a housing including slotted side walls, a feed pan arranged therein and positioned whereby access can be had thereto by the fowls, a combined feed supply directing and feed flow regulating means arranged within the housing and including a pair of spaced, upstanding, angle-shaped, angularly adjustable, oppositely disposed wall forming members positioned above the pan and including inwardly extending slotted flanges, and means coacting with said flanges and said slotted side walls, and means for independently adjusting bodily each of said members to regulate the flow of feed and for maintaining the member in adjusted position.

4. A poultry feeder comprising a housing, a feed pan arranged therein, said housing having an open front, bodily adjustable means within the housing for regulating the flow of feed to said pan, a hinged grate arranged within the housing and adapted to be positioned over the feed within the pan and further to abut against said means, and a feed saving tray positioned exteriorly of and hinged to the outer wall of the pan and adjustable relative thereto.

5. A poultry feeder comprising a housing, a feed pan arranged therein said housing having an open front, adjustable means within the housing for regulating the flow of feed to said pan, a grate having its outer side hinged against the inner face of the outer wall of the pan, arranged within the housing and adapted to be positioned over the feed within the pan and further having its inner side sliding against said means, a feed saving tray positioned at the front of the pan and adjustable relatively thereto, and the ends of the side walls of the said tray and housing having coacting means to provide for the supporting of the tray in adjusted position, the means at the ends of the tray extending into the housing.

6. A poultry feeder comprising a housing open at its front and rear, a pair of oppositely disposed feed pans arranged within the housing and positioned whereby access can be had by the chicks to the feed therein, means arranged in the housing and common to said pans for regulating the flow of feed thereto, grates hinged to the outer walls of said pans and coacting with said means to prevent chicks or fowls from falling into the pans and further providing means whereby access can be had by the chicks to the feed in the pans, and a feed saving tray hinged to the outer wall of each pan, arranged outwardly with respect thereto and capable of being adjusted relatively to the pans, and said trays and housing having coacting means for fixedly retaining the trays in adjusted position.

7. A poultry feeder comprising a housing open at its front and rear, a pair of oppositely disposed feed pans arranged within the housing and positioned whereby access can be had by the chicks to the feed therein, means arranged in the housing and common to said pans for regulating the flow of feed thereto, grates hinged against the inner faces of the outer walls of said pans and coacting with said means to prevent chicks or fowls from falling into the pans and further providing means whereby access can be had by the chicks to the feed in the pans, a feed saving tray hinged to the top of the outer wall of each pan, arranged outwardly with respect thereto and capable of being adjusted relatively to the pans, said trays and housing having coacting means for fixedly retaining the trays in adjusted position, and said feed regulating means and housing provided with coacting elements to provide for the bodily adjustment of said regulating means for regulating the flow of feed to the pans, said coacting elements further securing the feed regulating means in adjusted position.

8. A poultry feeder comprising a housing including a pair of side walls each provided with a set of spaced openings, a feed pan arranged therein and positioned whereby access can be had by the fowls to the feed therein, a grate hinged at its outer side to said pan and adapted to extend over the feed within the pan, means engaged by the inner side of said grate for supporting it in position to extend over the feed within the pan, a feed saving tray hinged to the pan and arranged exteriorly thereof, said tray being adjustable, and means carried by the ends of the tray and selectively engaging in the openings of said sets for maintaining the tray in adjusted position.

9. A poultry feeder comprising a feed pan, supporting means therefor including side walls each provided with a set of spaced openings, a grate provided with feed openings, said grate hinged at its outer side to said pan, means coacting with the inner side of the grate for maintaining it in position to extend over the feed within the pan, a feed saving tray hinged to the pan and positioned exteriorly thereof, said tray being adjustable, and means carried by the tray and selectively engaging in the openings of said sets for retaining the tray in adjusted position.

10. In a poultry feeder a combined feed supply directing and feed flow regulating means including a pair of oppositely disposed, spaced, upstanding, angle-shaped, oppositely disposed adjustable wall forming members adapted to be positioned over one or more feed pans, shiftable relatively to each other and each bodily shiftable and each provided with an inwardly extending slotted flange, and means coacting with said slotted flanges to provide for the bodily adjustment of each of said members to regulate the flow of feed and maintain the member in adjusted position.

11. A poultry feeder comprising a housing, a feed pan arranged therein and positioned whereby access can be had thereto by the fowls, a combined feed supply directing and feed flow regulating means arranged within the housing and including a pair of spaced, upstanding, angle-shaped, oppositely disposed angularly adjustable wall forming members positioned above the pan and each provided intermediate its ends with an inwardly extending slotted flange, means coacting with said flanges for bodily and independently adjusting each of said members to regulate the flow of feed and for maintaining the member in adjusted position, and a feed protecting grate hinged at its outer side to the outer wall of the pan and adapted to be extended upwardly to a position over the feed within the pan and further to be supported in such position by engagement with the inner side thereof with one of said members, said grate formed with spaced feed openings.

12. A poultry feeder comprising a housing, a feed pan arranged therein and positioned whereby access can be had thereto by the fowls, a combined feed supply directing and feed flow regulating means arranged within the housing and including a pair of spaced, upstanding, angle-shaped, angularly adjustable wall forming members positioned above the pan, means for independently adjusting each of said members to regulate the flow of feed and for maintaining the member in adjusted position, a feed protecting grate hinged to the pan and adapted to be extended upwardly to a position over the feed within the pan and further to be supported in such position by one of said members, said grate formed with spaced feed openings, and means carried by the pan for detachably securing the grate in a lowered position.

13. A poultry feeder comprising a housing, a feed pan arranged therein and positioned whereby access can be had thereto by the fowls, a combined feed supply directing and feed flow regulating means arranged within the housing and including a pair of spaced, upstanding, angleshaped, oppositely disposed, angularly adjustable wall forming members positioned above the pan and each formed with an inwardly extending slotted flange, means coacting with said flanges and said housing for bodily and independently adjusting each of said members to regulate the flow of feed and for maintaining the member in adjusted position, an adjustable feed saving tray hinged to the outer wall of the pan, and means for holding the tray in adjusted position.

14. A poultry feeder comprising a housing, a feed pan arranged therein and positioned whereby access can be had thereto by the fowls, a combined feed supply directing and feed flow regulating means arranged within the housing and including a pair of spaced, upstanding, angle-shaped, angularly adjustable wall forming members positioned above the pan, means for independently adjusting each of said members to regulate the flow of feed and for maintaining the member in adjusted position, a feed protecting grate hinged to the pan and adapted to be extended upwardly to a position over the feed within the pan and further to be supported in such position by one of said members, said grate formed with spaced feed openings, an adjustable step forming means hinged to the pan, and means for detachably securing said step forming means in adjusted position.

15. A poultry feeder comprising a housing, a feed pan arranged therein and positioned whereby access can be had thereto by the fowls, a combined feed supply directing and feed flow regulating means arranged within the housing and including a pair of spaced, upstanding, angle-shaped, angularly adjustable wall forming members positioned above the pan, means for independently adjusting each of said members to regulate the flow of feed and for maintaining the member in adjusted position, a feed protecting grate hinged to the pan and adapted to be extended upwardly to a position over the feed within the pan and further to be supported in such position by one of said members, said grate formed with spaced feed openings, means carried by the pan for detachably securing the grate in a lowered position, and means carried by one of said members for assisting the upward adjustment of said grate.

16. In a poultry feeder a combined feed supply directing and feed flow regulating means including an upstanding, angle. shaped, adjustable wall forming member provided with a pair of inwardly extending, upstanding opposed slotted flanges, and means coacting with the slots of said flanges for adjusting said member and for maintaining it in adjusted positions.

17. In a poultry feeder a housing, means arranged therein and in connection therewith for directing a feed supply and for regulating the flow of the feed, said means including an upstanding wall forming member comprising an angle shaped member having the upper part thereof extending outwardly at an upward inclination and its remaining part extending downwardly from the upper part and formed with a pair of upstanding inwardly extending opposed transversely slotted flanges, and means coacting with the slots of the flanges and said housing to provide for the adjusting of said member and for maintaining it in its adjusted position.

18. A poultry feeder comprising a housing having an open front, means arranged therein and in connection therewith providing a feed pan having its front wall positioned inwardly with respect to the open front of the housing, a feed saving tray arranged exteriorly of and hinged at its rear to said wall, said pan extending in the open front of the housing, and pivoted means carried by the tray at each end thereof and extending into and engaging in the inner face of the housing for adjustably supporting the tray in position.

19. A poultry feeder comprising a housing having an open front and rear and a closed top, means arranged within and in connection with the housing to provide a pair of feed pans, one having its outer wall positioned inwardly with respect to said open front and the other having its outer wall positioned inwardly with respect to said open rear, a feed saving tray mounted within the open front and within the open rear of the housing and exteriorly of said walls, means for hinging the rear of each tray to the top of one of said walls, means carried by said trays, extending into the housing and engaging in opposed walls of the latter for adjustably securing said trays in position, spaced wall members arranged within the housing and in connection therewith providing a combined feed supply directing and feed flow regulating means, said wall members and said housing having coacting elements to provide for adjustably positioning said wall forming members, said members arranged over said pans, and grates hinged against the inner faces of said outer walls, extending over said pans and slidably engaging the outer faces of said members.

20. In a poultry feeder, a housing having its side walls formed with opposed angle shaped slots, means arranged therein and in connection therewith for directing a feed supply and for regulating the flow of feed and comprising an angle shaped member having the upper part thereof extending outwardly at an upward inclination and its remaining part extending downwardly from the upper part and formed with a pair of upstanding inwardly extending opposed flanges each formed with a downwardly inclined slot, and means coacting with the slots of the flanges and the slots of said side walls to provide for the adjusting of said member and for maintaining it in its adjusted position.

21. In a poultry feeder a housing having its side walls formed with opposed angle shaped slots, means arranged therein and in connection therewith for directing a feed supply and for regulating the flow of feed and including an upstanding wall forming member provided with a pair of upstanding inwardly extending opposed flanges each formed with a downwardly inclined slot, and means co-acting with the slots of the flanges and the slots in said side walls to provide for the adjusting of said member and for maintaining it in its adjusted position.

In testimony whereof, I affix my signature hereto.

HAROLD S. SPEICHER.